May 6, 1969  G. A. HUGHES ET AL  3,442,920

PREPARATION OF 13-ALKYLGONA-1,3,5(10),8,14-PENTAENES

Filed Sept. 27, 1967

INVENTORS
GORDON A. HUGHES
HERCHEL SMITH

BY Vito Victor Bellino

__United States Patent Office__

3,442,920
Patented May 6, 1969

3,442,920
PREPARATION OF 13-ALKYLGONA-
1,3,5(10),8,14-PENTAENES
Gordon Alan Hughes, Haverford, Pa., and Herchel Smith,
500 Chestnut Lane, Wayne, Pa. 19087; said Hughes
assignor to said Smith
Continuation-in-part of application Ser. No. 461,908,
June 7, 1965. This application Sept. 27, 1967, Ser.
No. 670,982
Int. Cl. C07c *167/02, 169/10*
U.S. Cl. 260—397.45          8 Claims

ABSTRACT OF THE DISCLOSURE 13-alkylgona-1,3,5(10),8,14-pentaen-17-ones which are useful as intermediates in the total synthesis of 19-norsteroids are prepared from 1-tetralone in three steps. Reactions of a vinyl Grignard reagent with the 1-tetralone gives a 1-vinyl-1-tetralol which is condensed with a 1-alkyl-1,3-cyclopentanedione under Michael condensation conditions to obtain a 13-alkyl-8,14-secogona-1,3,5(10),9,(11)-tetraene-14,17-dione, which is in turn cyclodehydrated to give the 13-alkylgona-1,3,5(10),8,14-pentaen-17-ones.

This application is a continuation-in-part of copending application Ser. No. 461,908 filed June 7, 1965, which is a division and continuation-in-part of copending application Ser. No. 228,384 filed Oct. 4, 1962; which is a continuation-in-part of application Ser. No. 196,557 filed May 16, 1962, now abandoned.

This invention relates to compositions of matter classified in the art of chemistry as substituted unsaturated-gonane derivatives, to intermediates therefor, and to processes for making and using such compositions.

Figure 1:
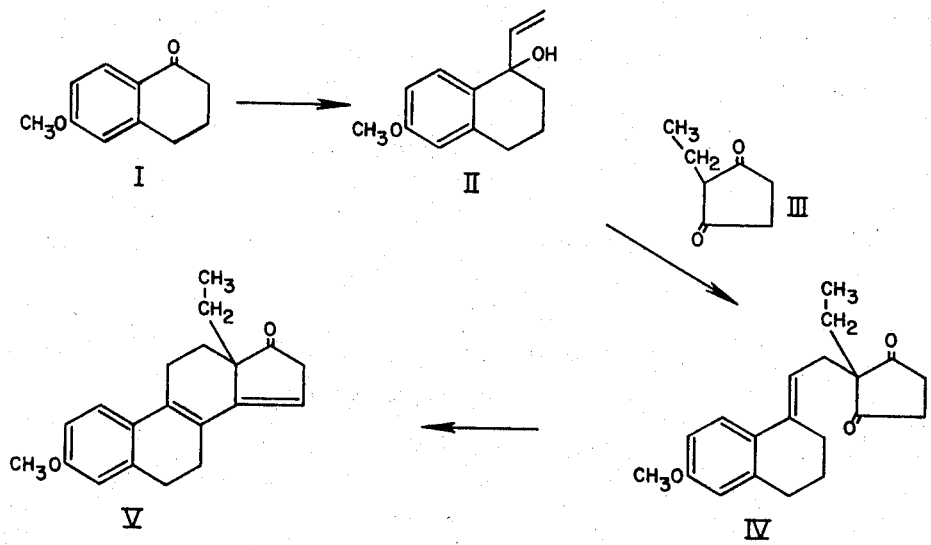

In describing the invention, reference will be made in the following specification to the annexed drawings wherein:

FIGURE 1 illustrates schematically the sequence of reactions for preparing a 13-alkylgona-1,3,5(10),8,14-pentaene from a tetralone and a 1,3-cycloalkanedione having at least one hydrogen at the 2-position, specifically 13β-ethylgona-1,3,5(10),8,14-pentaen - 17 - one from 6-methoxy-1-tetralone and 2-ethyl-1,3-cyclopentanedione.

Figure 2:
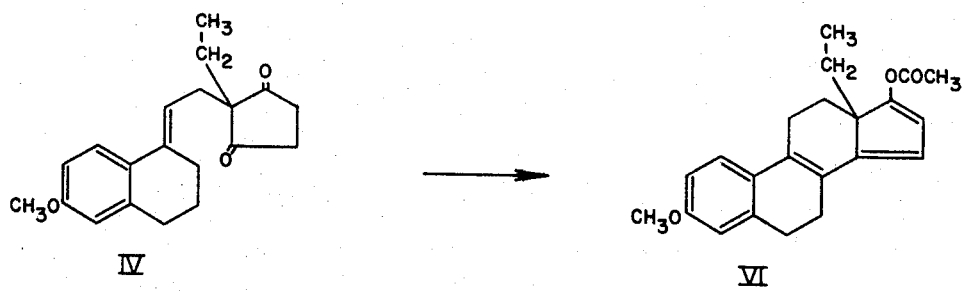

FIGURE 2 illustrates schematically the cyclization of a 2-alkyl - 2 - [2-(1,2,3,4-tetrahydro - 1 -naphthylidene)ethyl]-1,3-cyclopentanedione to prepare a 13-alkylgona-1,3,5(10),8,14,16-hexaene, specifically 2-ethyl - 2 - [2-(6-methoxy-1,2,3,4-tetrahydro - 1 - naphthylidene)ethyl]-1,3-cyclopentanedione to 17-acetoxy-13-ethyl-3-methoxy-gona-1,3,5(10), 8,14,16-hexaene.

The invention sought to be patented, in a principal composition aspect, is described as residing in the concept of the 8,14-secogona-1,3,5(10),9-tetraen-14-one nucleus having attached thereto in the 13-position a monovalent polycarbonalkyl radical (FIGURE 1, IV).

The tangible embodiments of the composition aspect of the invention possess the inherent general physical properties of being viscous gums or low melting (<120°) white crystalline solids, are substantially insoluble in water, and are generally soluble in polar solvents such as dimethylacetamide. Examination of compounds produced according to the hereinafter described process reveals, upon ultraviolet and infrared spectrographic analysis, spectral data supporting the molecular structures herein set forth. The aforementioned physical characteristics, taken together with the nature of the starting materials and the mode of synthesis, confirm the structure of the compositions sought to be patented.

The tangible embodiments of said composition aspect possess the use characteristic of being intermediates for the preparation of compositions which possess the use characteristic of exerting hormonal effects with unexpected separation of activity as evidenced by standard test procedures. Such compositions show estrogenic and blood lipid lowering effects, and these findings indicate their usefulness in the treatment of female hypogonadism, amenorrhea, dysmenorrhea, ovulation block, functional uterine bleeding, acne, arteriosclerosis, osteoporosis, hormone dependent tumors, infertility, and in contraception. In particular, it has been established that alterations of the natural steroid structure made possible by our discovery result not merely in a change of degree of hormonal activity but, as a result of the separation of types of hormonal activity, alter in an unexpected way its basic nature so that a desirable hormone effect is maximized and an undesirable hormone effect is minimized.

In addition to their inherent applied use characteristics, the compositions of this invention are useful in practicing the process aspect of the present invention in the making of the gonane compositions herein described according to the sequence of reactions described herein.

The invention sought to be patented, in a principal process of making the compositions aspect, as illustrated in annexed FIGURE 1 is described as residing in the concept of a sequence of reactions including reacting a compound having a 1-tetralone nucleus (I) with a vinyl Grignard reagent to obtain a compound with a 1-vinyl-tetral-1-ol nucleus (II); condensing said tetralol with a compound with a 1,3-cyclopentanedione nucleus having attached thereto in the 2-position a monovalent polycarbonalkyl radical, to obtain a compound with a 2-[2-(1,2,3,4-tetrahydro-1-naphthylidene)ethyl] - 1,3-cyclopentanedione nucleus having attached to the 2-position of the cyclopentane a monovalent polycarbon-alkyl radical (IV); cyclizing under acid reaction conditions to obtain a compound with a gona-1,3,5(10),8,14-pentaen-17-one nucleus having attached thereto in the 13-position a monovalent polycarbon-alkyl radical (V).

The invention sought to be patented in a second process aspect is described as residing in the concept of cyclizing a compound having a 2-alkyl-2-[2-(1,2,3,4-tetrahydro-1-naphthylidene)ethyl] - 1,3-cyclopentanedione nucleus under anhydrous acid conditions in the presence of certain enolalkylating or enolacylating reagents to form a 13-alkylgona-1,3,5(10),8,14,16-hexaene (FIGURE 2, VI).

The manner and process of making and using the invention will now be generally described so as to enable a person skilled in the art of chemistry to make and use the same, as follows:

Referring now to FIGURE 1 wherein the compounds are assigned Roman numerals for identification schematically, the sequence of reactions involved in the synthesis of a specific embodiment, namely 13β-ethyl-3-methoxy-8, 14-secogona-1,3,5(10),9-tetraene - 14,17 - dione, and the reaction involved in the use of said unsaturated secogonane to prepare a 13-alkylgona-1,3,5(10),8,14-pentaene, specifically 13β-ethyl - 3 - methoxy-gona - 1,3,5(10),8,14-pentaen-17-one, is illustrated.

The manner and process of making and using the invention will now be generally described so as to enable a person skilled in the art of chemistry to make and use the same, as follows:

Referring now to FIGURE 1 wherein the compounds are assigned Roman numerals for identification schematically, the sequence of reactions involved in the synthesis of a specific embodiment, namely 13β-ethyl-3-methoxy-8, 14-secogona-1,3,5(10),9-tetraene-14,17-dione, and the reaction involved in the use of said unsaturated secogonane to prepare a 13-alkylgona-1,3,5(10),8,14-pentaene, specifically 13β-ethyl-3-methoxygona-1,3,5(10),8,14-pentaen-17-one, is illustrated. 6-methoxy-1-tetralone (I) is treated with vinyl magnesium chloride or vinyl magnesium bromide in tetrahydrofuran to form 6-methoxy-1-vinyl-1-tetralol (II). This tetralol (II) is then reacted with 2-ethyl-1,3-cyclopentane-dione (III) under Michael condensation conditions, e.g. refluxing in methanolic potassium hydroxide, to form 2-ethyl-2-[2-(6-methoxy-1,2,3,4-tetrahydro-1-naphthylidene)ethyl]-1,3 - cyclopentanedione (IV). Compound IV is then cyclodehydrated, preferable at the reflux temperature of a solvent, such as ethanol, in the presence of a dehydrating acid, preferable hydrochloric acid, to effect ring closure to give the tetracyclic compound 13β-ethyl-3-methoxygona-1,3,5(10),8,14 - pentaen-17-one (V).

The aromatic ring of the tetralong (FIGURE 1, I) used as the starting material for the preparation of the compositions and initial preparations of the invention may be unsubstituted or have one or more substituents. In order not to deactivate the position for subsequent ring closure, the substituents (if any) must include a para-directing group (referring to electrophilic aromatic substitution) such as alkoxy, or alkylamino, and the group may be present initially or may be introduced later but before ring closure, either directly, or by conversion from a meta-directing group such as nitro.

The term "para-directing group (referring to electrophilic aromatic substitution)" as used herein means an activating group such as those hereinbefore listed and which activate all positions on the aromatic nucleus. Thus, if the group is para-directing, as defined above, it can be in a position meta to the ortho position to which ring closure is limited by steric considerations, said position being activated even though another position is more highly activated. Ring closure could not occur at the said more highly activated position because of the above-mentioned steric limitations. For the processes of the invention and except for the limitations expressed in this specification, variations of the substituents on the A-ring of the fully formed tetracyclic structures, or the intermediates leading thereto, are full equivalents of each other.

The carbon atoms at postions 3 and 4 of the starting tetral-1-one (I) can be substituted, as, for example, with an alkyl group such as methyl or ethyl. These substituents will appear in the 8,14-seco structures of the invention at the 7- and 6-positions respectively.

For the processes of the invention and except for the limitations expressed in this specification, variations of the B-ring on the fully formed tetracyclic structures, or on the intermediates leading thereto, are full equivalents of each other.

In the step involving condensation of the vinyl tetralol, the nucleophilic compound is a cyclopentane-1,3-dione which is monosubstituted at the 2-position. By varying the group at the 2-position of the cyclopentane-1,3-dione, the invention provides a way to product compounds resembling natural steroids save at the 13-position. The starting materials for the preparation of the 2-substituted 1,3-cyclopentanediones are ketones of the structure

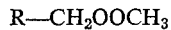

R—CH$_2$OOCH$_3$ where R is the substituent which will appear at the 2-position of the 1,3-cyclopentanediones.

The starting ketone is reacted with diethyl oxalate in the presence of base to form a cyclopentane-1,3,4-trione-5-glyxolic ester substituted at position 2 with the group R present in the starting ketone. The product is treated with acid to remove the 5-substituent, and the 4-ketone function is then removed by Wolff-Kishner reduction, involving selective semicarbazone formation at C$_4$ and heating the product with base such as sodium hydroxide. On acidification the required 2-substituted-1,3-cyclopentane dione can be isolated. Thus, the group R, which eventually forms the 2-substituent of the 1,3-cyclopentane dione, can be any organic group which is stable to acid and to Wolff-Kishner conditions and can be methyl, ethyl, propyl, cetyl, diethylaminoethyl, etc. Thus alkyl groups of varying chain length such as, for example, ethyl, isopropyl, cetyl etc. may be introduced to form the gonane correspondingly substituted at the 13-position. Further, gonanes may be prepared wherein the 13-position is substituted with any organic radical. Thus, but without limiting the generality of the foregoing, an aralkyl or cycloalkylalkyl, bearing a hydroxy, amino, or alkylamino-substituent can readily be placed in the 13-position, and from such compounds other variations of the 13-position substituent can be prepared, as halo alkyl from hydroxyalkyls, or quaternary salts, amides, alkenyls, etc. from aminoalkyls.

For the processes of the invention and except for the limitations expressed in this specification, variations at the 13-position of the fully formed tetracyclic structures or on the intermediates leading thereto are the full equivalents of the claimed 13-position polycarbonalkyl substituents, having pharmacological activity of the same type.

It will be apparent that the keto groups of the 8,14-secogona-1,3,5(10),9-tetraene-14,17-dione nucleus can be reduced to hydroxy. Selective reduction of one of the two keto groups (which are equivalent) can be achieved by conventional means such as by treating with sodium borohydride as described by E. Elisberg, H. Vanderhaege and T. E. Gallagher, J. Amer. Chem. Soc., 74, 2814 (1952), and D. K. Fukushima and S. Dobriner, J. Org. Chem., 26, 3022 (1961), or with lithium aluminum tritertiary butoxyhydride as described by J. A. Zderic and J. Iriarte, J. Org. Chem., 27, 1756 (1962).

For the processes of the invention and except for the limitations expressed in this specification, modifications of one of the keto groups in the 8,14-secogona-14,17-dione structures are full equivalents of the claimed 8,14-secogona-1,3,5(10),9-tetraene-14,17-diones.

The specific reactions involved in the process of the invention will now be considered, as follows, reference being made to the drawings for typifying compounds:

The vinyl tetralol (II) is condensed with a nucleophilic compound under Michael reaction conditions. Thus the condensation can be carried out by bringing the two reagents together in solution in the presence of a base, for example, pyridine, triethylamine, diethylamine, sodium hydroxide, sodium methoxide or sodium hydrogen carbonate, and heating as required. The nature and amount of base employed in the condensation reaction will depend on the particular reagents used. Suitable solvents are hydrocarbons, such as benzene, and anhydrous alcohols, such as methanol.

As hereinbefore noted, cyclodehydration of the C-ring is carried out under acidic conditions. Suitable are strong acids such as sulfuric, hydrochloric, p-toluene sulfonic, formic etc. in such solvents as benzene, toluene, cyclohexene, anhydrous alcohols etc., by mixtures thereof. The preferred treatment is with methanolic hydrochloric acid at room temperature or at reflux. As hereinbefore noted, it has been found that the ease of C-ring closure of the compounds of the invention to form tetracyclic compounds is affected by the nature of the substituent on the preformed aromatic A-ring, and that subsequent cyclization is easier to carry out when the preformed aromatic A-ring contains a substituent which activates the position at which cyclization is to occur. Where a compound is to be used directly for C-ring closure, it will in practice be one containing such a substituent. Those substituents which cause subsequent C-ring closure to occur readily are substituents which are groups that in electrophilic aromatic substitution activate an aromatic ring and are predominantly o- and p-directing: for example the hydroxy or alkoxy group.

When the C-ring closure is carried out in the presence of acylating agents such as isopropenyl acetate cyclization of the C-ring is accompanied by the enol-acylation of the remaining ketone and the product is a 13-alkylgona-1,3,5(10),8,14-hexaene-17-ester (FIGURE 2, IV). When the cyclization is carried out in the presence of an alcohol and a trialkylorthoformate, the product is a 13-alkylgona-1,3,5(10),8,14,16-hexaen-17-ether.

While the tetracyclic compounds in this specification and the appended examples are named to describe the configuration to that of the natural steroids, it is to be understood that unless otherwise indicated, the product of each of the given manipulative procedures is a racemic mixture which contains said named compounds and its enantiomorph.

EXAMPLE 1

3-methoxy-13β-methyl-8,14-secogona-1,3,5(10),9-tetraene-14,17-dione

Add 1-vinyl-6-methoxy-1-tetralol (14 g.) to 2-methylcyclopentane-1,3-dione (10 g.) in methanol (40 cc.) containing potassium hydroxide (50 mg.) and reflux the mixture for 5 hours. Evaporate the reaction mixture to a small bulk and add ether (200 cc.). Wash the ethereal solution with water, aqueous sodium carbonate, brine and dry. Evaporate the solvent and crystallize from ethanol to obtain the title product, M.P. 77–78°; UV: 267 mμ ($\epsilon$18,000).

To obtain 13β - ethyl - 3 - methoxy-8,14-secogona-1,3,5(10),9-tetraene - 14,17-dione, treat 1-vinyl-6-methoxy-1-tetralol with 2 - ethylcyclopentane-1,3-dione and methanolic potassium hydroxide according to the manipulative procedure described above.

To obtain 13β - n - propyl-3-methoxy-8,14-secogona-1,3,5(10),9-tetraene-14,17-dione, treat 1-vinyl-6-methoxy-1-tetralol with 2 - n - propylcyclopentane-1,3-dione and methanolic potassium hydroxide according to the manipulative procedure described above.

To obtain 13β - n - butyl - 3 - methoxy-8,14-secogona-1,3,5(10),9-tetraene-14,17-dione, treat 1-vinyl-6-methoxy-1-tetralol with 2-n-butylcyclopentane - 1,3 - dione and methanolic potassium hydroxide according to the manipulative procedure described above.

To obtain 13β - methyl - 3 - ethoxy-8,14-secogona-1,3,5(10),9-tetraene-14,17-dione, treat 1-vinyl-6-ethoxy-1-tetralol with 2-methylcyclopentane-1,3-dione and methanolic potassium hydroxide according to the manipulative procedure described above.

To obtain 13β-ethyl-3-ethoxy-8,14-secogona-1,3,5(10), 9-tetraene-14,17-dione, treat 1-vinyl-6-ethoxy-1-tetralol with 2-ethylcyclopentane-1,3-dione and methanolic potassium hydroxide according to the manipulative procedure described above.

To obtain 13β - n - propyl - 3 - ethoxy-8,14-secogona-1,3,5(10),9-tetraene-14,17-dione treat 1-vinyl-6-ethoxy-1-ethoxy - 1 - tetralol with 2-n-propylcyclopentane-1,3-dione and methanolic potassium hydroxide according to the manipulative procedure described above.

To obtain 13β - n - butyl-3-ethoxy-8,14-secogona-1,3, 5(10),9-tetraene-14,17-dione, treat 1-vinyl-6-ethoxy-1-tetralol with 2-n-butylcyclopentane - 1,3 - dione and methanolic potassium hydroxide according to the manipulative procedure described above.

To obtain 13β - ethyl - 8,14 - secogona-1,3,5(10),9-tetraene-14,17-dione, treat 1-vinyl-1-tetralol with 2-ethylcyclopentane-1,3-dione and methanolic potassium hydroxide according to the manipulative procedure described above.

To obtain 13β - n - propyl-8,14-secogona-1,3,5(10),9-tetraene - 14,17 - dione, treat 1-vinyl-1-tetralol with 2-n-propylcyclopentane-1,3-dione and methanolic potassium hydroxide according to the manipulative procedure described above.

To obtain 13β - ethyl - 3 - hydroxy-8,14-secogona-1,3, 5(10),9-tetraene-14,17-dione, treat 1-vinyl-6-hydroxy-1-tetralol with 2-ethylcyclopentane-1,3-dione and methanolic potassium hydroxide according to the manipulative procedure described above.

To obtain 13β - ethyl - 3 - methoxy - 6 - methyl-8,14-secogona-1,3,5(10),9-tetraene - 14,17 - dione, treat 1-vinyl-6-methoxy-4-methyl-1-tetralol with 2 - ethylcyclopentane-1,3-dione and methanolic potassium hydroxide according to the manipulative procedure described above.

To obtain 13β - ethyl - 3 - methoxy - 7 - methyl-8,14-secogona-1,3,5(10),9-tetraene-14,17-dione, treat 1-vinyl-6-methoxy-3-methyl-1-tetralol with 2-ethylcyclopentane-1,3-dione and methanolic potassium hydroxide according to the manipulative procedure described above.

EXAMPLE 2

13β-ethyl-3-methoxy-8,14-secogona-1,3,5(10), 9-tetraene-14,17-dione

Add 6-methoxy-1-vinyl-1-tetralol (112 g.) to a suspension of 2-ethylcyclopentane-1,3-dione (80 g.) in methanol (275 cc.) containing potassium hydroxide (0.3 g.). Reflux the mixture for 6 hours, concentrate to small volume and add benzene (400 cc.) and ether (400 cc.). Wash the organic solution with dilute aqueous sodium hydroxide, water and brine, and evaporate the solvent. Recrystallize from methanol to obtain the title compound (120 g.). Purify by further recrystallization from methanol; M.P. 65–67°; ultraviolet absorption maximum at 266 mμ ($\epsilon$ 17,000).

Calculated for $C_{20}H_{24}O_3$: C, 80.01%; H. 9.42%. Found: C, 80.2%; H. 9.21%.

EXAMPLE 3

3-benzyloxy-13β-methyl-8,14-secogona-1,3,5(10), 9-tetraene-14,17-dione

Reflux 6-hydroxy-1-tetralone (4 g.) in water (10 cc.) and methanol (1 cc.) with benzyl chloride (3.1 g.) and sodium hydroxide (1 g.) for 2 hours. Add water to the cooled reacton mixture and isolate the product by extraction with ether and benzene. Dissolve the residue in benzene, filter through a column of alumina and recrystallize the product from cyclohexane to obtain 6-benzyloxy-1-tetralone (3.2 g.), M.P. 96–99°.

Dissolve the above benzyl ether (3.1 g.) in tetrahydrofuran (15 cc.) and add the solution to vinyl magnesium chloride (from magnesium 1.44 g.) in tetrahydrofuran (200 cc.) and stir for 5 hours. Pour into saturated aqueous ammonium chloride and isolate the product by means of ether to obtain 6-benzyloxy-1-vinyl-1-tetralol as a gum (3.2 g.).

Reflux this vinyl ether (3 g.) and 2-methylcyclopentane-1,3-dione (1.5 g.) with 0.12% methanolic potassium hydroxide (25 cc.) for 5 hours. Evaporate most of the solvent, add water and extract the mixture with ether-benzene. Wash, dry and evaporate the organic solution and chromatograph the residue on Florex eluting with a mixture of benzene and hexane. Evaporate the eluate to obtain the title compound as a gum (1 g.); infrared absorption peaks at 2.75, 6.2, 6.7μ.

EXAMPLE 4

3-benzyloxy-13β-ethyl-8,14-secogona-1,3,5(10), 9-tetraene-14,17-dione

Reflux 6-benzyloxy-1-vinyl-1-tetralol (3.2 g.) and 2-ethylcyclopentane-1,3-dione (1.5 g.) with 0.12% methanolic potassium hydroxide (25 cc.) for 5 hours. Evaporate most of the solvent under reduced pressure, add water and isolate the product with ether and benzene. Chromatograph the product on Florex and recrystallize the solid fractions from ether-methanol to obtain the title compound (0.8 g.), M.P. 64–67°; infrared absorption peaks at 5.75, 6.2, 6.7μ.

Calculated for $C_{26}H_{28}O_3$: C, 80.5%; H, 7.2%. Found: C, 80.4%; H, 7.3%.

EXAMPLE 5

13β-methyl-3-tetrahydropyranyloxy-8,14-secogona-1,3,5(10),9-tetraene-14,17-dione Keep 6-hydroxy-1-tetralone (4 g.) for 3 days at room temperature in a mixture of dihydropyran (15 cc.) and tetrahydrofuran (10 cc.) containing 2 drops of 10 N hydrochloric acid. Pour the mixture into aqueous sodium hydrogen carbonate and isolate the product by means of ether. Recrystallize from methanol to obtain 6-tetrahydropyranyloxy-1-tetralone (5.5 g.), M.P. 91–93°. Keep this material with vinyl magnesium chloride (from magnesium 1.42 g.) in tetrahydrofuran (20 cc.) for 16 hours and then add ice-cold aqueous ammonium chloride and extract the mixture with ether. Wash and dry the ethereal solution and evaporate to give 6-tetrahydropyranyloxy-1-vinyl-1-tetralol (6.1 g.) as a gum: infrared absorption peaks at 2.95, 6.1, and 6.05μ.

Reflux the above pyranyl ether (6.1 g.) with 2-methylcyclopentane-1,3-dione (3 g.) in methanol (50 cc.) containing potassium hydroxide (0.06 g.) for 8 hours. Concentrate the mixture, add ether (50 cc.) and benzene (50 cc.) and wash the solution with 10% aqueous sodium hydroxide, water, and brine. Evaporate to obtain the title compound as a gum (7.1 g.); ultraviolet absorption maximum at 270 mμ (ε 10,200); infrared absorption peaks at 2.0, 5.8, 6.25μ.

EXAMPLE 6

13β-ethyl-8,14-secogona-1,3,5(10), 9-tetraen-14,17-dione

Add α-tetralone (28 g.) in ether (100 cc.) to a stirred solution of vinyl magnesium chloride (from magnesium 12 g. and vinyl chlorine 32 g.) in tetrahydrofuran (300 cc.) at −18° and allow to warm to 25° and keep for 18 hours with stirring.

Pour onto ice and ammonium chloride and isolate the product with ether to give 1-vinyl-1-tetralol as a viscous oil (30 g.). To this oil (5 g.) add 2-ethylcyclopentane-1,3-dione (5 g.) and potassium hydroxide (0.15 g.) and heat the mixture under nitrogen at 150° for 2 hours. To the cooled product add methanol and water and isolate the product with ether to give the title compound as a gum (5 g.); ultraviolet absorption maximum 257 mμ (ε 14,500); infrared absorption peaks at 5.7, 5.8μ.

EXAMPLE 7

2,3-dimethoxy-13β-methyl-8,14-secogona-1,3,5(10), 9(11)-tetraene-14,17-dione

Dissolve 6,7-dimethoxy-1-tetralone (6.1 g.) in tetrahydrofuran (50 cc.) and add the solution to 400 cc. of 2 molar vinyl magnesium chloride in tetrahydrofuran at room temperature. Let stand for 4 hours and pour into saturated ammonium chloride solution. Extract with ether, wash with water, dry and evaporate to obtain 1,2,3,4-tetrahydro-6,7-dimethoxy-1-vinyl-1-naphthol. Dissolve this product in methanol (30 cc.) and add the solution to 2-methylcyclopentane-1,3-dione (4 g.) in methanol (5 cc.) containing a trace of potassium hydroxide. Reflux for 3 hours, cool, pour into water and extract with ether. Wash the ethereal extracts with aqueous sodium bicarbonate and water, dry and evaporate the solvent and recrystallize the residue from methanol to obtain the title compound (5.45 g.), M.P. 104–106°.

Calculated for $C_{20}H_{24}O_4$: C, 73.12%; H, 7.37%. Found: C, 73.37%; H, 7.14%.

EXAMPLE 8

3-cyclopentyloxy-13β-ethyl-8,14-secogona-1,3,5(10),9-tetraene-14,17-dione

Dissolve 6-hydroxy-1-tetralone (16.2 g.) and sodium hydroxide (4 g.) in water (20 cc.) and ethanol (100 cc.) and add cyclopentyl bromide (21 g.). Heat the mixture under reflux for 16 hours, evaporate to dryness, cool, add water and extract with ether. Wash the ethereal solution with 2 N sodium hydroxide, water and dry. Evaporate the solvent and distil to obtain 6-cyclopentyloxy-1-tetralone (9.8 g.), B.P. 163–165/0.4 mm.

Dissolve 6-cyclopentyloxy-1-tetralone (8.6 g.) in tetrahydrofuran (30 cc.) and add the solution to 40 cc. of vinyl magnesium bromide (from magnesium 1.95 g. and vinyl bromide 6.5 cc.) in tetrahydrofuran at 25°. Let stand for 4 hours and pour into saturated ammonium chloride solution. Extract with a mixture of ether and benzene and wash, dry and evaporate to obtain 1,2,3,4-tetrahydro-6-cyclopentyloxy-1-vinyl-1-naphthol as an oil (9.45 g.). Dissolve this product in methanol (100 cc.) and add the solution to 2-methylcyclopentane-1,3-dione (5 g.) in methanol (5 cc.) containing potassium hydroxide (0.1 g.). Reflux for 6 hours, cool, pour into water and extract with ether, wash and dry the ethereal solution and evaporate the solvent to obtain the title compound as an oil (11.8 g.); ultraviolet absorption at 267 mμ (ε 18,050).

EXAMPLE 9

13β-ethyl-3-methoxy-7-methyl-8,14-secogona-1,3,5(10),9-tetraene-14,17-dione

Stir 3-(m-methoxyphenyl)-2-methyl acrylic acid (1.5 g.) with stannic chloride (2 cc.) at 100° for 1 hour. Cool, add water and extract with ether. Wash, dry and evaporate the organic solution to obtain 6-methoxy-3-methyl-1-tetralone (1 g.), M.P. 70° (from ether-light petroleum).

Add a solution of 6-methoxy-3-methyl-1-tetralone (2.5 g.) in tetrahydrofuran (15 cc.) to a 3 molar solution of vinyl magnesium chloride in tetrahydrofuran (12 cc.) over a period of 30 minutes. Stir for 1½ hours and pour the reaction mixture into a mixture of aqueous ammonium chloride (10 cc.) and crushed ice (10 g.). Extract the mixture with ether-benzene and wash, dry and evaporate the organic solution to obtain 6-methoxy-3-methyl-1-vinyl-1-tetralol as a brown oil (2.9 g.). Add this alcohol (2.9 g.) to a solution of 2-ethylcyclopentane-1,3-dione (1.6 g.) in methanol (6 cc.) containing potassium hydroxide (0.01 g.) and reflux the mixture for 6 hours. Cool and filter the solution and add enough methanol to dissolve the precipitated oil. Cool in a Dry Ice-acetone bath and filter the precipitate. Recrystallize from methanol to obtain the title compound, M.P. 79–80° (2.0 g.); ultraviolet absorption at 267 mμ (ε 18,600).

Calculated for $C_{21}H_{26}O_3$: C, 77.27%; H, 8.03%. Found: C, 77.09%; H, 8.07%.

EXAMPLE 10

13β-ethyl-3-tetrahydropyranyloxy-8,14-secogona-1,3,5(10),9-tetraene-14,17-dione

Reflux 6-tetrahydropyranyloxy-1-vinyl-1-tetralol (69.5 g.) with 2-ethylcyclopentane-1,3-dione (75 g.) in 0.12% methanolic potassium hydroxide (500 cc.) for 6 hours. Evaporate to small bulk and add ether (200 cc.) and benzene (200 cc.). Wash the solution with 5% aqueous sodium hydroxide, water and brine and dry. Evaporate the solvent to obtain the title compound (59 g.).

EXAMPLE 11

17-hydroxy-3-methoxy-13β-methyl-8,14-secogona-1,3,5(10),9-tetraen-14-one

Dissolve 3-methoxy-13β-methyl-8,14-secogona-1,3,5(10),9-tetraene-14,17-dione (0.5 g.) in tetrahydrofuran (8 cc.), methanol (8 cc.) and water (2 cc.). Add sodium borohydride (0.2 g.) and stir for 3 minutes at 25°. Add water and extract with ether. Wash, dry and evaporate the organic solution to give the title compound as a gum (0.49 g.). This compound can be acylated with an acyl halide in pyridine and the product cyclised with p-toluene sulfonic acid in benzene to 17-acyloxy-3-methoxy-13β-methylgona-1,3,5(10),8,14-pentaene.

EXAMPLE 12

17-hydroxy-3-methoxy-13β-methyl-8,14-secogona-1,3,5(10),9-tetraen-14-one

Dissolve 3-methoxy-13β-methyl-8,14-secogona-1,3,5(10),9-tetraen-14,17-dione (5 g.) in tetrahydrofuran (100 cc.) and stir with lithium aluminum tritertiarybutoxyhydride (5 g.) for 20 hours. Add water and ammonium chloride, filter and dilute the filtrate with benzene and wash with water and brine and dry. Evaporate the solution to obtain the title compound (4.88 g.) as a gum.

EXAMPLE 13

3-methoxy-13β-methyl-8,14-secogona-1,3,5(10),9-tetraene-14,17-diol

Reflux 3-methoxy-13β-methyl-8,14-secogona-1,3,5(10),9-tetraene-14,17-dione (2 g.) in tetrahydrofuran (100 cc.) with lithium aluminum hydride (1 g.) for 2 hours. Decompose excess reducing agent by adding ethyl acetate, then add water and extract with ether. Wash, dry and evaporate the organic solution to obtain the title compound as a gum (2 g.). Distil at 200° (bath) 10.2 mm. to obtain a pure sample.

Calculated for $C_{19}H_{26}O_3$: C, 75.46%; H, 8.67%. Found: C, 75.37%; H, 8.42%.

The following illustrates the use of the compounds of the invention in preparing other compounds having hormonal activity, and are exemplary of a process aspect of the invention:

EXAMPLE 14

13β-methyl-3-methoxygona-1,3,5(10),8,14-pentaen-17-one

Add 13β-methyl-3-methoxy-8,14-secogona-1,3,5(10),9-tetraene-14,17-one (14 g.) to a solution of anhydrous toluene-p-sulphonic acid (14 g.) in dry benzene (500 cc.). Allow the mixture to stand at room temperature for 3 hours and then add ether (100 cc.) and wash with water, aqueous sodium carbonate, brine and dry. Remove the solvent under reduced pressure and distil the red gummy residue at 230° (bath temperature) 0.2 mm. Hg. Crystallize the distillate to obtain the title product.

To obtain 13β-ethyl-3-methoxygona-1,3,5(10),8,14-pentaen-17-one cyclize 13β-ethyl-3-methoxy-8,14-secogona-1,3,5(10),9-tetraene-14,17-dione with toluene-p-sulphonic acid according to the manipulative procedure described above.

To obtain 13β-n-propyl-3-methoxygona-1,3,5(10),8,14-pentaene-17-one cyclize 13β-n-propyl-3-methoxy-8,14-secogona-1,3,5(10),9-tetraene 14,17-dione with toluene-p-sulphonic acid according to the manipulative procedure described above.

To obtain 13β-n-butyl-3-methoxygona-1,3,5(10),8,14-pentaene-17-one cyclize 13β-n-butyl-3-methoxy-8,14-secogona-1,3,5(10),9-tetraene-14,17-dione with toluene-p-sulphonic acid according to the manipulative procedure described above.

To obtain 13β-methyl-3-ethoxygona-1,3,5(10),8,14-pentaene-17-one cyclize 13β-methyl-3-ethoxy-8,14-secogona-1,3,5(10),9-tetraene-14,17-dione with toluene-p-sulphonic acid according to the manipulative procedure described above.

To prepare 13β-ethyl-3-ethoxygona-1,3,5(10),8,14-pentaene-17-one treat 13β-ethyl-3-ethoxy-8,14-secogona-1,3,5(10),9-tetraene-14,17-dione with toluene-p-sulphonic acid according to the manipulative procedure described above.

To prepare 13β-n-propyl-3-ethoxygona-1,3,5(10),8,14-pentaene-17-one treat 13β-n-propyl-3-ethoxy-8,14-secogona-1,3,5(10),9-tetraene-14,17-dione with toluene-p-sulphonic acid according to the manipulative procedure described above.

To prepare 13β-n-butyl-3-ethoxygona-1,3,5(10),8,14-pentaene-17-one treat 13β-n-butyl-3-ethoxy-8,14-secogona-1,3,5(10),9-tetraene-14,17-dione with toluene-p-sulphonic acid according to the manipulative procedure described above.

To prepare 13β-ethyl-3-hydroxygona-1,3,5(10),8,14-pentaene-17-one treat 13β-ethyl-3-hydroxy-8,14-secogona-1,3,5(10),9-tetraene-14,17-dione with toluene-p-sulphonic acid according to the manipulative procedure described above.

To prepare 13β-ethyl-3-methoxy-6-methylgona-1,3,5(10),8,14-pentaene-17-one treat 13β-ethyl-3-methoxy-6-methyl-8,14-secogona-1,3,5(10),9-tetraene-14,17-dione with toluene-p-sulphonic acid according to the manipulative procedure described above.

To prepare 13β-ethyl-3-methoxy-7-methylgona-1,3,5(10),8,14-pentaene-17-one treat 13β-ethyl-3-methoxy-7-methyl-8,14-secogona-1,3,5(10),9-tetraene-14,17-dione with toluene-p-sulphonic acid according to the manipulative procedure described above.

EXAMPLE 15

13β-methyl-3-methoxygona-1,3,5(10),8,14-pentaene-17-one

Dissolve 13β-methyl-3-methoxy-8,14-secogona-1,3,5(10),9-tetraene-14,17-dione (0.5 g.) in methanol (15 cc.) at 40° and add 10 N hydrochloric acid until the solution becomes turbid. Allow the mixture to cool to 25° and after 1 hour filter the precipitate and recrystallize from methanol to obtain the title product (0.4 g.), M.P. 112–115°; ultraviolet absorption peak at 313 mμ (ε 34,500).

To prepare 13β-ethyl-3-methoxygona-1,3,5(10),8,14-pentaen-17-one cyclize 13β-ethyl-3-methoxy-8,14-secogona-1,3,5(10),9-tetraene-14,17-dione with hydrochloric acid according to the manipulative procedure described above.

EXAMPLE 16

13β-ethyl-3-methoxygona-1,3,5(10),8,14-pentaen-17-one

Dissolve 13β-ethyl-3-methoxy-8,14-secogona-1,3,5(10),9-tetraene-14,17-dione (14.4 g.) in dry benzene (500 cc.) containing anhydrous p-toluenesulphonic acid (15 g.) and allow the mixture to stand at 25° for 3 hours. Add ether (100 cc.) and wash the solution with water, aqueous sodium carbonate, brine and dry. Evaporate the solvent and distil the residue at 235° (bath temperature) at 0.25 mm. Recrystallize the distillate from ethanol containing a little ethyl acetate to obtain the title product (6.3 g.), M.P. 69–71°.

EXAMPLE 17

3-benzyloxy-13β-methyl-8,14-secogona-1,3,5(10),8,14-pentaen-17-one

Dissolve 3-benzyloxy-13β-methyl-8,14-secogona-1,3,5(10),9-tetraen-14,17-dione (1 g.) in ethanol (10 cc.) at 60° and treat the solution with 10 N hydrochloric acid (1 cc.). After 4 minutes add water (10 cc.) and extract the mixture with cyclohexane (2×30 cc.). Wash, dry and evaporate the organic extracts and recrystallize the residue from cyclohexane to obtain the title compound (0.42 g.), M.P. 131–133°.

EXAMPLE 18

3-benzyloxy-13β-ethylgona-1,3,5(10),8,14-pentaen-17-one

Dissolve 3-benzyloxy-13β-ethyl-8,14-secogona-1,3,5(10),9-tetraene-14,17-dione (0.8 g.) in ethanol (10 cc.) at 60° and add 10 N hydrochloric acid (1 cc.). After 4 minutes add water (10 cc.) followed by cyclohexane (30 cc.). Separate the organic layer and extract the aqueous layer with cyclohexane (30 cc.). Wash, dry and evaporate the combined organic extracts and evaporate the solvent. Recrystallize the residue from ethanol to obtain the title compound (0.371 g.), M.P. 131–134°; infrared absorption peaks at 5.75, 6.25, 6.65μ.

EXAMPLE 19

3-hydroxy-13β-methylgona-1,3,5(10),8,14-pentaen-17-one

Stir 13β-methyl-3-tetrahydropyranyloxy-8,14-secogona-1,3,5(10),9-tetraene-14,17-one (1 g.) with polyphosphoric acid (10 cc.) at 60° for 15 minutes. Add water to the cooled mixture and extract with ether-ethyl acetate (1:1, 25 cc.). Wash, dry and evaporate the organic extract and wash the residue with a little ether to afford the title product (0.045 g.), M.P. 206–210° (dec.); ultraviolet absorption peak at 315 mμ (ε 25,000).

EXAMPLE 20

3-hydroxy-13β-methylgona-1,3,5(10),8,14-pentaen-17-one

Stir 13β - methyl - 3-tetrahydropyranyloxy-8,14-secogona-1,3,5(10),9-tetraene - 14,17-dione (7.1 g.) in methanol (20 cc.) with 10 N hydrochloric acid (2 cc.) for 5 minutes at 20° and then add water (3 cc.) and cool to 0°. Filter the product and wash with aqueous methanol to obtain the title compound (3.4 g.), M.P. 216–220°.

EXAMPLE 21

2,3-dimethoxy-13β-methylgona-1,3,5(10),8,14-pentaen-17-one

Reflux 2,3 - dimethoxy - 13β-methyl-8,14-secogona-1,3,5(10),9-tetraene-14,17-dione (1 g.) in methanol (15 cc.) and add 10 N hydrochloric acid until the solution becomes turbid. Add tetrahydrofuran dropwise until the solution is clear and reflux for 5 minutes. Cool, filter the solid, wash with methanol and recrystallize from ethanol to obtain the title compound, M.P. 137–140°.

Calculated for $C_{20}H_{22}O_3$: C, 77.39%; H, 7.11%. Found: C, 77.17%; H, 7.05%.

EXAMPLE 22

3-cyclopentyloxy-13β-ethylgona-1,3,5(10),8,14-pentaen-17-one

Reflux 3 - cyclopentyloxy - 13-ethyl-8,14-secogona-1,3,5(10),9-tetraene-14,17-dione (11.8 g.) in methanol (100 cc.) and 10 N hydrochloric acid (8 cc.) for 45 minutes. Add water and isolate the product with ether. Chromatograph on a column of Florisil (400 g.), eluting with benzene and recrystallize the solid fractions from ethyl acetate-methanol to obtain the title compound, 5.35 g., M.P. 93–96°; ultraviolet absorption peak at 313 mμ (ε 30,900).

EXAMPLE 23

13β-ethyl-3-methoxy-7-methylgona-1,3,5(10),8,14-pentaen-17-one

Stir 13β - ethyl - 3-methoxy-7-methyl-8,14-secogona-1,3,5(10),9-tetraene-14,17-dione (1 g.) in benzene (50 cc.) containing anhydrous p-toluene sulphonic acid (0.5 g.) for 2 hours at 25°. Cool the mixture, filter, and wash, dry and evaporate the residue to obtain the title compound as a gum (0.8 g.), ultraviolet absorption peark at 313 mμ (ε 28,600).

EXAMPLE 24

13β-ethyl-3-hydroxygona-1,3,5(10),8,14-pentaen-17-one

Stir 13β - ethyl-3-hydroxygona-1,3,5(10),8,14-secogona-1,3,5(10),9-tetraene (50 g.) in methanol (150 cc.) with 10 N hydrochloric acid (15 cc.) for 10 minutes. Add a little water, cool to 0° and filter. Recrystallize the residue from methanol to give the title compounds (39.7 g.), M.P. 160–162°.

EXAMPLE 25

13β-ethylgona-1,3,5(10),8,14-pentaene-17-one

Stir 13β - ethyl-8,14 - secogona - 1,3,5(10),9-tetraene-14,17-dione (5 g.) in benzene (50 cc.) with polyphosphoric acid (20 g.) for 30 minutes at room temperature. Add water and extract the mixture with ether. Wash and dry the organic extracts and evaporate the solvent to give the title compound as a gum.

To prepare 13β-n-propylgona-1,3,5(10),8,14-pentaene-17-one treat 13β-n-propyl - 8,14 - secogona - 1,3,5(10),9-tetraene-14,17-dione with polyphosphoric acid according to the manipulative procedure described above.

EXAMPLE 26

13β-ethyl-3-methoxygona-1,3,5(10),8,14,16-hexaen-17-ol, acetate

Reflux 13-ethyl-3-methoxy-8,14-secogona-1,3,5(10),9-tetraene-14,17-dione (1.5 g.) with isopropenyl acetate (25 cc.) and toluene-p-sulfonic acid (0.25 g.) for 4 hours with distillation of ca. 10 cc. of the solvent. Cool, dilute with ether and wash, dry and evaporate the organic solution. Filter the solid residue through a short column of Florisil and recrystallize the product from ethanol-hexane to give the title compound, M.P. 119–120°.

EXAMPLE 27

17-ethoxy-13β-ethyl-3-methoxygona-1,3,5(10),8,14,16-hexaene

Dissolve 13 - ethyl - 3 - methoxy - 8,14 - secogona-1,3,5(10),9-tetraen-14,17-dione (1 g.) in ethanol (4 cc.) and ethyl orthoformate (1 cc.), add concentrated sulfuric acid (1 drop) and keep the mixture at 45° for ½ hour. Add ethyl orthoformate (0.5 cc.) and keep the mixture at 55° for a further ½ hour. Pour the cooled mixture into saturated aqueous sodium hydrogen carbonate and isolate the product with ether. Filter the product through a column of Florisil with hexane containing 10% benzene and evaporate the eluate and recrystallize from ethanol to obtain the title compound, M.P. 78–80°; ultraviolet absorption at 353 Mμ (ε25,000).

The subject matter which the applicants regard as their invention is particularly pointed out and distinctly claimed as follows:

1. A process for preparing a compound with a gona-1,3,5(10),8,14-pentaen-17-one nucleus substituted in the 13-position by a polycarbonalkyl radical, comprising (a) treating a compound having a 1-tetralone nucleus with a vinyl Grignard to obtain a 1-vinyl-1-tetralol nucleus (b) condensing said 1-vinyl-1-tetralol compound under Michael condensation conditions with a compound having a 1,3-cyclopentanedione nucleus substituted in the 2-position with a polycarbon-alkyl radical to obtain a compound with an 8,14-secogona-1,3,5(10),9(11) - tetraene - 14,17-dione nucleus substituted in the 13-position with a polycarbon-alkyl radical; and (c) cyclodehydrating said condensation product in the presence of a dehydrating acid.

2. A process for preparing a compound with a gona-1,3,5(10),8,14-pentaen-17-one nucleus substituted in the 13-position by a polycarbonalkyl radical, comprising (a) condensing a compound having a 1-vinyl-1-tetralol nucleus under Michael condensation conditions with a compound having a 1,3-cyclopentanedione nucleus substituted in the 2-position with a polycarbon-alkyl radical to obtain a compound with an 8,14-secogona-1,3,5(10),9(11)-tetraene-14,17-dione nucleus substituted in the 13-position with a polycarbon-alkyl radical; and (b) cyclodehydrating said condensation product in the presence of a dehydrating acid.

3. A process for preparing a compound with a gona-1,3,5(10),8,14-pentaen-17-one nucleus substituted in the 13-position by a polycarbon-alkyl radical comprising cyclodehydrating a compound with an 8,14-secogona-1,3,5(10),9(11)-tetraene-14,17-dione nucleus substituted in the 13-position with a polycarbon-alkyl radical in the presence of a dehydrating acid.

4. A process for preparing a compound with a 13-methylgona-1,3,5(10),8,14-pentaen-17-one nucleus comprising (a) treating a compound having a 1-tetralone nucleus with a vinyl Grignard to obtain a 1-vinyl-1-tetralol nucleus (b) condensing said 1-vinyl-1-tetralol compound under Michael condensation conditions with a compound having a 2-methyl-1,3-cyclopentanedione nucleus to obtain a compound with a 13 - methyl - 8,14 - secogona-1,3,5(10),9(11)-tetraene-14,17-dione nucleus; and (c) cyclodehydrating said condensation product in the presence of a dehydrating acid.

5. A process for preparing a compound with a 13-methyl-gona-1,3,5(10),8,14-pentaen-17-one nucleus comprising (a) condensing a compound having a 1-vinyl-1-tetralol nucleus under Michael condensation conditions with a compound having a 2-methyl-1,3-cyclopentanedione nucleus to obtain a compound with a 13-methyl-8,14-secogona-1,3,5(10),9(11) - tetraene-14,17-dione nucleus, and (b) cyclodehydrating said condensation product in the presence of a dehydrating acid.

6. A process for preparing a compound with a 13-methylgona-1,3,5(10),8,14-pentaen-17-one nucleus comprising cyclodehydrating a compound having a 13-methyl-8,14-secogona-1,3,5(10),9(11) - tetraene-14,17-dione nucleus in the presence of a dehydrating acid.

7. A process for preparing an esterified gona-1,3,5(10),8,14,16-hexaen-17-ol substituted in the 13-position by a polycarbon-alkyl radical comprising cyclodehydrating a compound with an 8,14 - secogona-1,3,5(10),9(11)-tetraene-14,17-dione nucleus substituted in the 13-position by a polycarbon-alkyl radical under anhydrous acidic conditions in the presence of a dehydrating acid and in the presence of a suitable enol esterifying reagent.

8. A process for preparing an etherified gona-1,3,5(10),8,14,16-hexaenol substituted in the 13-position by a polycarbon-alkyl radical comprising cyclodehydrating a compound with an 8,14-secogona-1,3,5(10),9(11)-tetraene-14,17-dione nucleus substituted in the 13-position by a polycarbonalkyl radical under anhydrous acidic conditions in the presence of a dehydrating acid and in the presence of an enol etherifying reagent.

No references cited.

HENRY A. FRENCH, *Primary Examiner.*

U.S. Cl. X.R.

260—397.5, 586, 590, 612, 618, 999